June 18, 1935.  C. E. HEDRICK  2,005,188
FEEDER
Filed July 9, 1934
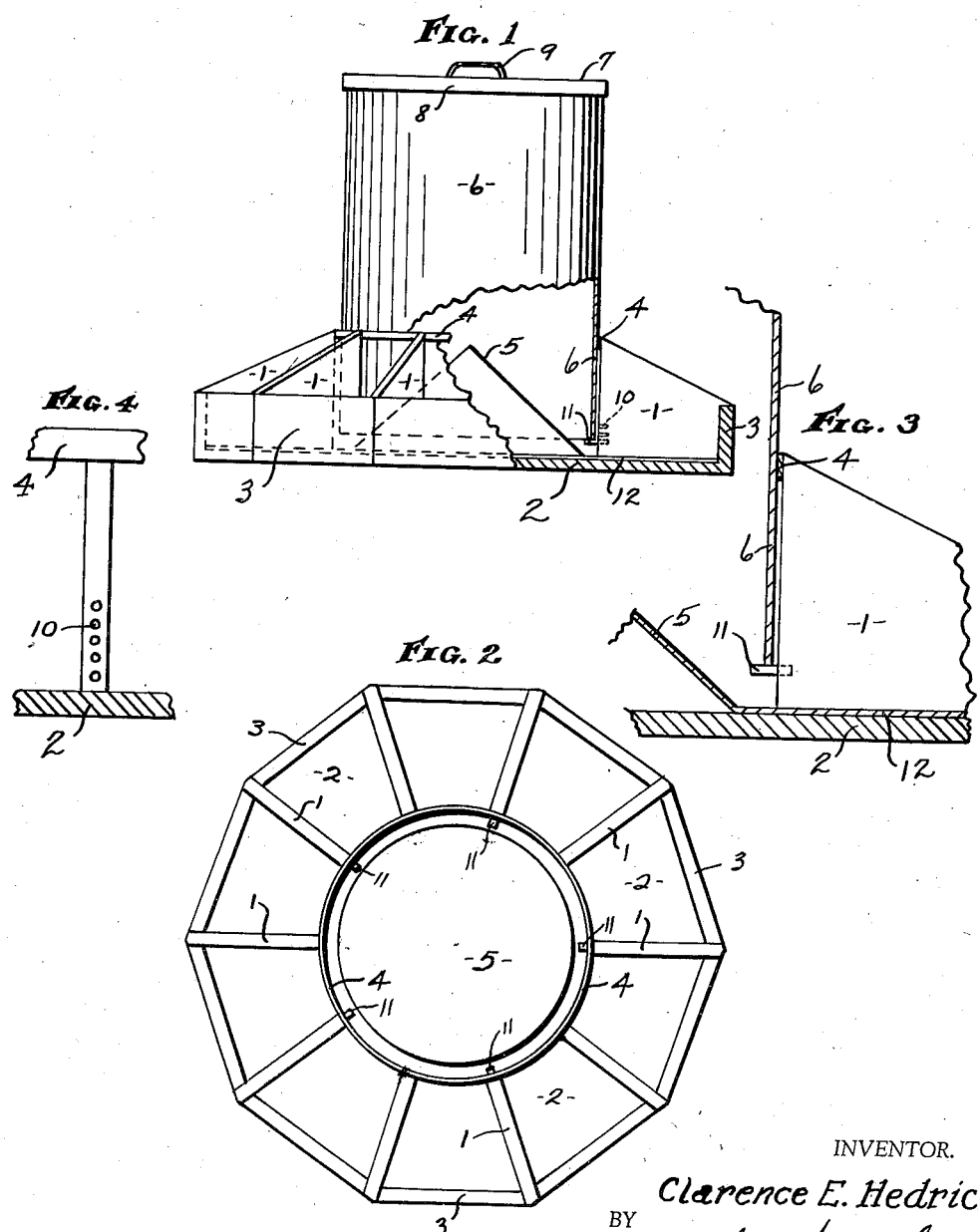
INVENTOR.
Clarence E. Hedrick
BY U.Y.Charles
ATTORNEY.

Patented June 18, 1935

2,005,188

UNITED STATES PATENT OFFICE 2,005,188

FEEDER

Clarence E. Hedrick, Newton, Kans.

Application July 9, 1934, Serial No. 734,323

3 Claims. (Cl. 119—53)

My invention relates to improvement in feeders. The object of my invention is to provide a feeder automatic in its delivery of the food substance to live stock, poultry, or the like.

A further object of my invention is to provide a feeder having a series of box-like structures arranged in a polygonal base portion, by which means the longitudinal axis of the body portion of stock such as horses, cattle, hogs, sheep or the like are positioned radially with respect to the base, whereby ample room is attained for the body portion of such stock but the heads thereof are in close proximity to each other.

A still further object of my invention is to provide a feeder having a polygonal base portion with a container axially extending upward therefrom, and means to support the said container at a desired space from the bottom of the base to accommodate feed of various kinds with respect to the grinding or cracking of cereal to pass into the box-like structures, as it is consumed therefrom by the stock, and furthermore, a feeder that will deliver the entire contents of its container to its plurality of troughs simultaneously.

A still further object of my invention is to provide a container inexpensive to construct and efficient with respect to the delivery of the food substance, and to eliminate excess crowding of the stock while feeding; furthermore, the base of the feeder to receive a container arranged from a metal oil barrel such as commonly used for the transportation of lubricant or the like.

These and other objects will hereinafter be more fully explained, reference being had to the accompanying drawing forming part of this specification, and in which like characters will apply to like parts in the different views.

Referring to the drawing:

Figure 1 is a side view of the feeder, parts broken away for convenience of illustration.

Figure 2 is a plan view of Figure 1, the container being removed for convenience of illustrating the center portion thereof.

Figure 3 is an enlarged detailed view of a fragmentary portion of the base and container.

Figure 4 is a transverse view of Figure 3, showing the arrangement of the inner edge partitions that are apertured.

My invention herein disclosed consists of a polygonal base portion having a plurality of feed troughs formed therearound by partition elements 1, radially extending. The said partitions are secured to the bottom 2, and an outer wall 3, while the inside end portions thereof have an annular band 4 placed near the top thereof and secured to each, functioning as a guide for a container later described.

Concentrically positioned to the annular band and partitions above described is a conical structure 5, the apex of which upwardly extends, by which means and position thereof the said cone element functions as a deflector radially discharging food contents to the said feed troughs positioned therearound, and to acquire such efficiency with respect to delivering the food substance, I have positioned a cylindrical container 6, axially extending upward from the base, and fitting snugly within the said annular band 4, but removable therefrom without excess friction. The lower end of the said container is open so that the contents thereof is free to move downward and outward into the different feed troughs as consumed therefrom. The upper end of the said container has a lid 7, closely fitting thereon through the medium of its chime 8, engaging on the outside of the container as a weatherproof means. To remove the lid, I have arranged a handle 9, concentrically positioned thereto. Extending into and spaced apart vertically on the inner ends of alternate partitions is a plurality of apertures 10, adapted to receive a pin 11, insertable therein, there being one pin to each partition, and when placed in corresponding apertures with respect to a horizontal plane, is the support for the container. When seated thereon, and being thus arranged, the said container may be spaced as desired from the bottom of the base, the space being governed by comminution of cereal or other food substance placed in the container, to avoid congestion while passing through and into the feed troughs, it being understood that the side walls of the said troughs will hold sufficient feed to block the continuous flow of the said feed from the container, but automatically replenish it as consumed by stock or fowls feeding thereon. As a matter of durability, I have placed a lining 12 on the bottom of the feed troughs, the same being preferably of galvanized iron or similar material employed in the construction of the conical element, but I do not wish to be restricted to such, as the same may be omitted, or other embodiments may be employed without departing from the spirit and scope of the appended claims.

Having fully described my invention, what I claim is new, and desire to secure by Letters Patent, is:

1. In a feeder a base element polygonal in form, and having an outer wall upwardly extending, and a bottom therefor, a conical baffle secured to the bottom concentric to the wall, a plurality of partitions radially extending and joined to the wall at the outer ends thereof, an annular band secured to the inner end of each partition near the upper edge thereof, a portion of the said partitions having a plurality of apertures spaced apart vertically, and a pin insertable in a selected aperture of each apertured partition, and a cylindrical container open at one end and positioned on the said pins said pins spacing the container from the floor.

2. In a feeder of the class described comprising a base polygonal in contour, and having a floor, a partition radially positioned and connected to the intersecting adjacent straight side portions of the polygonal sides of the base, the inner ends of the said partitions being spaced from the common center of the said base, a band connecting the inner ends of the said partitions, and positioned near the top portion thereof, a conical baffle concentric to the band and forming deflecting means toward the space between the inner ends of the said partitions, a food container having an open bottom and loosely engaging the inner surface of the band, and means to space the lower end of the container from the floor of the base at a desired distance therefrom, all substantially as shown.

3. In a feeder of the class described comprising a base polygonal in contour, and having a floor, a partition radially positioned and connected to the intersecting adjacent straight side portions of the polygonal sides of the base, the inner ends of the said partitions being spaced from the common center of the said base, a band connecting the inner ends of the said partitions, and positioned near the top portion thereof, the inner vertical end of some of the partitions having a plurality of apertures spaced apart and horizontally disposed, and a pin for each of the apertured partitions, insertable in the apertures selectively, a food container having an open end so that the peripheral edge thereof will rest upon the pins as spacing means from the bottom, and a baffle directing the movement of food in a container outward, substantially as shown.

CLARENCE E. HEDRICK